June 30, 1964 P. J. DE PASQUALE 3,139,229
DIVIDER FOR CONTAINERS
Filed Sept. 5, 1961
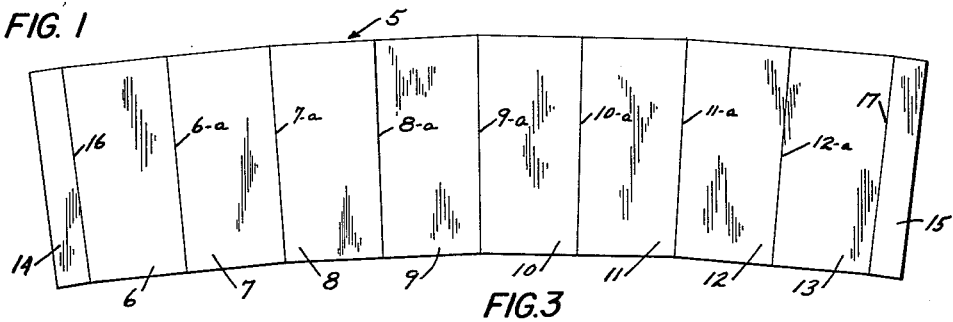
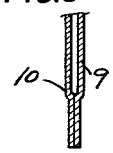
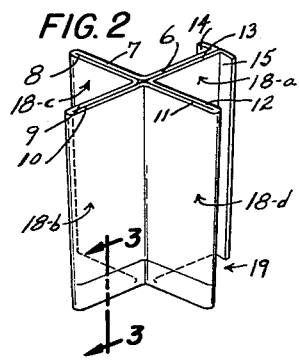
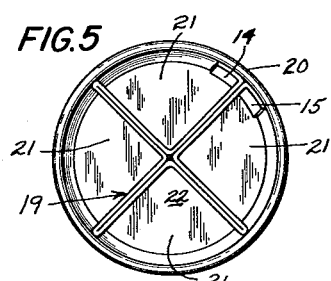
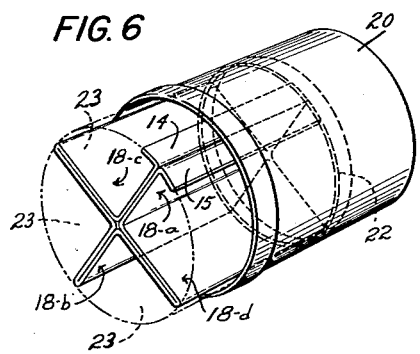
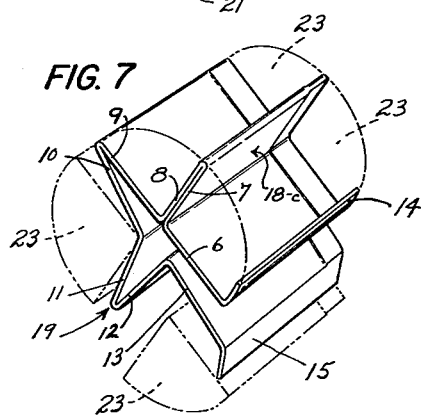
INVENTOR.
PATRICK J. DePASQUALE
BY
ATTORNEY

3,139,229
Patented June 30, 1964

1

3,139,229
DIVIDER FOR CONTAINERS
Patrick J. De Pasquale, 221 Grandview Terrace,
Hartford, Conn.
Filed Sept. 5, 1961, Ser. No. 136,038
3 Claims. (Cl. 229—42)

This invention relates generally to containers, especially for comestible products, and has particular reference to a novel divider for containers for separating the contents thereof into a plurality of individual portions.

For many years some manufacturers, processors and packers have separated or divided or otherwise pre-proportioned certain of their goods within the containers or cartons used to merchandise the same. More recently, however, the demand for such packaged pre-proportioned or pre-divided goods has significantly increased, particularly in the food industry where one is now able to purchase pre-proportioned mixes for practically every baking need, and even individualized, pre-proportioned servings for entire meals packaged within a single container. The increased demand for pre-proportioned food servings is not only by the consumer alone for his own use, but also by industry for commercial uses. With the ever increasing cost of labor, restaurants, caterers, and other food servers are eager to purchase bulk, pre-proportioned, individual food servings, especially for such use as banquets, group dinners, in-flight airline meals, and other such instances where both labor costs and time, as well as convenience, are important factors. While the individual consumer who purchases his pre-proportioned food items in the grocery store is not primarily concerned with the labor factor, the reduced preparation time, the ease of handling and the convenience are generally his primary concern.

An object of this invention, therefore, is to provide a divider for containers or the like which will divide the contents thereof into a plurality of pre-proportioned sections.

A further object of the present invention is to provide such a divider which is adapted for use in containers of various shapes and sizes.

A still further object of the present invention is to provide a divider which may be inexpensively formed from a one-piece blank of paper-like material.

A still further object of the present invention is to provide a divider of the type described which may be shipped and stored in a flat position, requiring only a minimum of storage room therefor.

Still another object of the present invention is to provide a divider which will permit a highly sanitary means of dividing comestibles within a container without the requirement of precutting or other handling.

A still further object of the present invention is to provide a divider suitable for insertion into a container filled with a semi-solid or plastic substance for dividing said substance into a plurality of pre-proportioned parts or segments.

Still another object of the present invention is to provide a divider from which the pre-proportioned sections may be readily and conveniently removed.

A still further object of the present invention is to provide such a divider which may be economically produced using mass production techniques.

Further objects and advantages of this invention will be more clearly understood from the following description and the accompanying drawing in which:

FIG. 1 is a plan view of the blank from which my novel divider is formed.

FIG. 2 is a perspective view of the divider of my invention.

2

FIG. 3 is a fragmentary, sectional view thereof, taken on line 3—3 of FIG. 2.

FIG. 4 is an elevational end view of my unique divider shown folded for shipping and/or storing.

FIG. 5 is a top plan view showing my divider inserted into a container for ice cream or the like.

FIG. 6 is a perspective view illustrating a preferred manner of removing the divider and the ice cream from the container of FIG. 5.

FIG. 7 is a perspective view illustrating the manner in which the pre-proportioned segments of ice cream are separated from the divider.

The divider of the present invention is particularly intended for use in containers of spumoni ice cream produced by the method described in my prior U.S. Patent No. 2,975,732, dated March 21, 1961, and such use thereof is illustrated in the present application. It will be understood by those skilled in the art, however, that my improved divider may also be used in containers for a variety of other products such as cheese, gelatin desserts, jellies and the like with equally satisfactory results.

As shown in the drawing, my invention is embodied in a divider for containers preferably constructed from an elongated, one-piece, flat blank or strip 5 of relatively light, durable, flexible material having sufficient stiffness to maintain its shape while the divider is inserted into a container having ice cream therein of a semi-solid or plastic consistency. Said strip includes a plurality of substantially identical panels 6, 7, 8, 9, 10, 11, 12 and 13 defined by and foldable about transverse, scored, fold lines 6–a, 7–a, 8–a, 9–a, 10–a, 11–a and 12–a, respectively, as shown in FIG. 1. End tabs 14 and 15 extend from and form continuations of panels 6 and 13, respectively, and are foldable about transverse, scored, fold lines 16 and 17, respectively.

In accordance with my invention, the divider 18 shown in FIG. 2 may be readily formed from said strip 5 by first folding the panels 6 through 13 about the fold lines 6–a through 12–a successively in alternating directions in an accordion-type fold, to bring the inside surface of panel 6 in juxtaposition with the inside surface of panel 13; and likewise, the inside surface of panel 9 in juxtaposition with the inside surface of panel 10; and panels 7 and 8, and 11 and 12, respectively, similarly juxtaposed to form a plurality of vertical walls 18–a, 18–b, 18–c and 18–d, respectively, angularly spaced about a central, vertical axis and extending radially therefrom, as shown in FIG. 2, to form a divider 19. Opposed end tabs 14 and 15, contiguous with and extending outwardly from the free, outer ends of panels 6 and 13, respectively, may be folded about scored fold lines 16 and 17, respectively, to extend perpendicularly outwardly from the outer ends of juxtaposed panels 6 and 13 whereby the said tabs are disposed on the free outer edge of the wall 18–a formed therefrom as shown in FIG. 2. It can be readily understood that when the divider 19 is placed into a container 20, having an inside diameter equal to approximately twice the width of the said walls, it will thus divide the said container into four substantially equal compartments or sections 21.

To pre-proportion a container of ice cream into a plurality of substantially equal segments, my divider may be inserted into the container either before or after filling it with the semi-solid ice cream. The methods used in producing some forms of ice cream, particularly spumoni ice cream as shown in my previously mentioned patent, require that the inside of the container be free from all obstructions such as separators, dividers and so forth, in which case it is necessary that the divider be inserted into the container after it has been filled. To prevent the ice cream from getting between the inside surfaces of the folded panels and thereby separating them when inserting the divider into a filled container, I have treated the said blank with any one of the many well-known materials, such as paraffin, whereby pressure applied to the outer surfaces of the said panels along the lower edges thereof will cause the said panels to become firmly, but releasably, bonded together along the said lower edges as shown in FIG. 3. Such treatment also tends to reduce the natural tendency of the ice cream to adhere to the surfaces of the divider and, therefore, further facilitates the release of the ice cream segments therefrom. In addition to the foregoing, the said paraffin or similar agent also serves to provide additional stiffness along the lower edges of the panels thus permitting my divider to be inserted into semi-solid or plastic materials of relatively high viscosity or into solid materials which are readily penetrable such as gelatin and the like.

The container shown in FIGS. 5 and 6 is of the well-known type in wide use for ice creams and other frozen comestibles and is provided with an inwardly tapered side wall having a "push-out" bottom 22. This well-known construction thus permits the ready removal of the solid contents of the container conforming to the shape thereof by merely applying pressure on the underside of the bottom 22, as shown in FIG. 6, in which the divider of my invention has been inserted to divided the ice cream into pre-proportioned segments 23 as shown in broken lines.

While my divider is readily adapted for use with containers having either tapered or perpendicular side walls, FIG. 1 of the drawing illustrates the blank or strip from which I form a divider adapted for use with containers having tapered side walls. It can be seen that the said blank comprises an elongated strip whose upper and lower edges are defined by equi-angular chords of concentric arcs having a common center outwardly of, and below, the lower edge of the said strip. The fold lines 16, 7–a, 9–a, 11–a and 17 are segments of equi-angular radii emerging from the said center of the concentric arcs, joining the ends of the chords—the angular disposition of the said radii about the said center being determined by, and conforming to, the taper, of the side wall of the container with which my divider is to be used. The fold lines 6–a, 8–a, 10–a and 12–a are likewise angularly equal radii of said arcs and bisect the said chords. It is thus apparent to one skilled in the art that the panels 6 through 13, shown in FIG. 1, and defined by the said concentric arcs and radii thereof, are of a trapezoidal configuration and that while the said scored fold lines 6–a, 8–a, 10–a and 12–a are perpendicular with respect to the upper and lower edges of their respective panels, the fold lines 16, 7–a, 9–a, 11–a and 17 are angularly disposed with respect thereto. It will therefore also be obvious that when the blank is folded as shown in FIG. 2, the outer edges of the panels will be tapered and the inner edges perpendicular with respect to the bottom of the container into which the divider is to be inserted and also parallel with the central, vertical axis of the said divider.

When using other dividers generally in use, considerable difficulty is usually experienced, in separating the ice cream segments from the surfaces of the divider, because of the cohesion developed therebetween during the hardening of the ice cream, and it is usually necessary to insert a knife or other similar utensil between the ice cream and the divider surfaces to separate it therefrom. It can readily be understood that this practice would of necessity involve the handling of the food itself. With the divider of my invention, however, once the contents of the container have been removed therefrom, the individual ice cream segments may readily be separated from the divider by merely grasping the end tabs 14 and 15 and pulling them outwardly in opposite directions from each other as shown in FIG. 7. As the end tabs are so pulled, the divider unfolds, so to speak, and extends to its original strip form, and the segments 23 of ice cream are instantly released from the surfaces of the divider without the necessity of using any utensil to remove them therefrom and are ready for serving without further handling.

It is readily apparent that the divider of my invention permits the provision of pre-proportioned segments of ice cream or other similar comestibles with a degree of sanitation heretofore unavailable. Modern production methods and techniques permit the filling of the container with the ice cream by mechanical means through the use of specially designed nozzles which inject it therein while in a semi-solid or plastic state. Sanitary, automatic handling equipment position and press the divider into the container having the semi-solid ice cream therein, cap the container with a snugly fitting cover and convey the filled container to freezing compartments in which the ice cream becomes cooled and further hardened. It will now be particularly obvious to one skilled in the art that the use of my improved divider will greatly reduce the very serious problem of food contamination of this class of goods caused by excessive handling thereof. No longer is it necessary to hand cut ice cream and the like or struggle with hard-to-remove dividers.

It is to be noted that while my improved divider provides many novel and useful advantages and conveniences not heretofore provided in conventional dividers, it can be produced from readily available standard materials, and its design adapts itself to mass production techniques whereby it can be produced inexpensively. It is also to be noted that the divider of my invention may be packaged, shipped and stored in space-saving, flat form as shown in FIG. 4.

While I have shown a form of my divider adapted to pre-portion packaged comestibles into approximately four equal segments, it is understood that the basic structure of my divider is such that it may likewise be made to segment packaged foods into any number of substantially equal portions. It is further understood that while I have shown my divider as used with a container of frusto-conical configuration, it may be used equally as efficiently and conveniently with containers of practically any shape, form or size.

I claim:

1. An edible frozen comestible mold comprising a plurality of preproportioned, individual portions in juxtaposition about a central vertical axis, a container for said mold, and a divider in said container defining and separating said portions, said divider being coaxial with said central vertical axis and having a plurality of vertical walls disposed angularly thereabout and extending radially therefrom, said divider being formed of an elongated strip of flexible sheet material having an upper and a lower edge and a plurality of spaced divergent fold lines extending transversely thereof dividing said strip into a plurality of substantially identical panels of trapezoidal configuration, said panels being foldable about said fold lines successively in alternate directions in an accordion type fold, consecutive pairs of adjacent panels being juxtaposed to form said vertical walls, integral end portions contiguous with the outer edge of the outermost of the said panels, foldable about scored fold lines to form opposed outwardly extending end tabs on the outer edge of one wall whereby when said mold is removed from said container, the said portions may be separated from said divider by grasping the said end tabs and extending the divider into its original strip form.

2. A divider for containers, said divider having a central vertical axis and a plurality of vertical walls disposed angularly about said axis and extending radially therefrom, said divider being formed from an elongated strip of flexible sheet material having an inside surface and an outside surface, a plurality of equal, transverse, scored fold lines on said elongated strip defining a plurality of similar adjacent panels, said panels being foldable about said scored fold lines successively in alternate directions in an accordion type fold, with the inside surfaces of the outermost panels in juxtaposition and consecutive pairs of adjacent panels similarly juxtaposed to form said vertical walls, the outer edge of one of said walls being formed by the outer edges of said outermost panels, and end portions contiguous with the outer edges of the said outermost panels foldable about said scored fold lines to form opposed outwardly extending end tabs on the outer edge of said one wall, each of said vertical walls being formed with a compressed lower edge portion having a cross-sectional area less than the cross-sectional area of the upper edge portion thereof whereby said lower edge portion is more rigid and said divider may be readily insertable in a semi-solid material.

3. A container comprising an outer member and an inner member removably insertable thereinto, said outer member including a bottom and upwardly extending sides surrounding the periphery of said bottom and inclined angularly outwardly therefrom, said inner member having a vertical central axis coaxial with that of said outer member and a plurality of vertical, dividing walls disposed angularly about said axis and extending radially therefrom to divide the said outer member into a plurality of substantially equal sections, said inner member being formed of an elongated strip of flexible sheet material having an upper and a lower edge and a plurality of spaced divergent fold lines extending transversely thereof, said fold lines dividing said strip into a plurality of substantially identical panels of trapezoidal configuration foldable about said fold lines successively in alternate directions in an accordion type fold to form said vertical walls, the outer edges of said vertical walls being angularly inclined to correspond to the inclination of said sides of said outer member, the inner edges of said vertical walls being parallel with the said vertical central axis whereby the said inner member may be readily removable from said outer member, and including integral end portions contiguous with the outer edges of the outermost of said panels and foldable about scored fold lines to form opposed outwardly extending end tabs on the outer edge of one of said vertical walls normally positioned against said upwardly extending sides of said outer member whereby the said inner member when removed from said outer member may be extended into its original strip form by grasping said tabs and pulling them in opposite directions.

References Cited in the file of this patent

UNITED STATES PATENTS

| | | |
|---|---|---|
| 2,685,366 | Jenner | Aug. 3, 1954 |
| 2,693,296 | Nemesio | Nov. 2, 1954 |
| 2,995,291 | Swanson et al. | Aug. 8, 1961 |